Mar. 27, 1923.
H. ADELMANN
1,449,850
CORNED BEEF COOKER
Filed Dec. 24, 1921
2 sheets-sheet 1
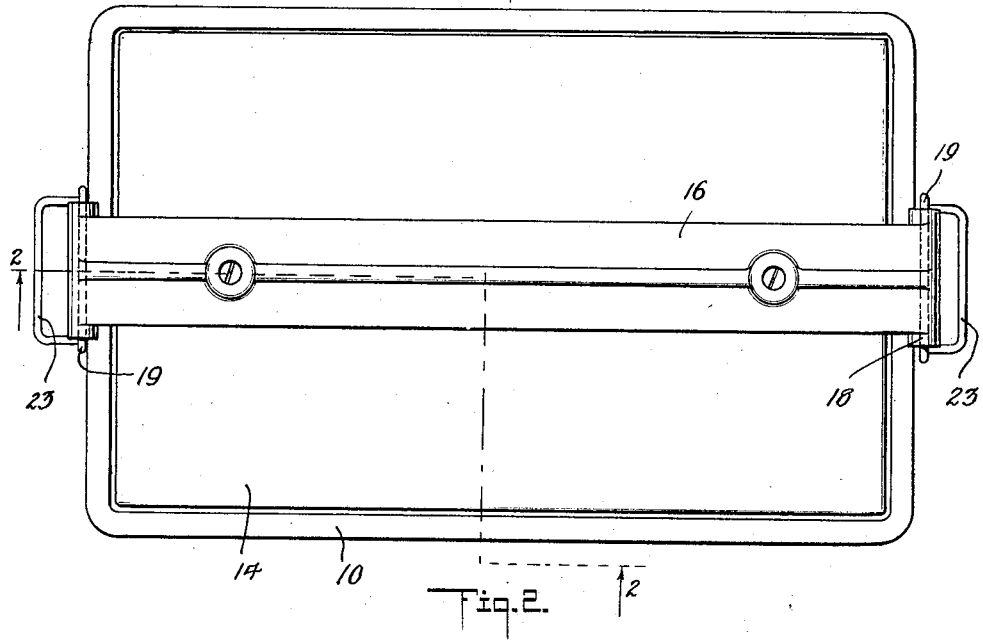
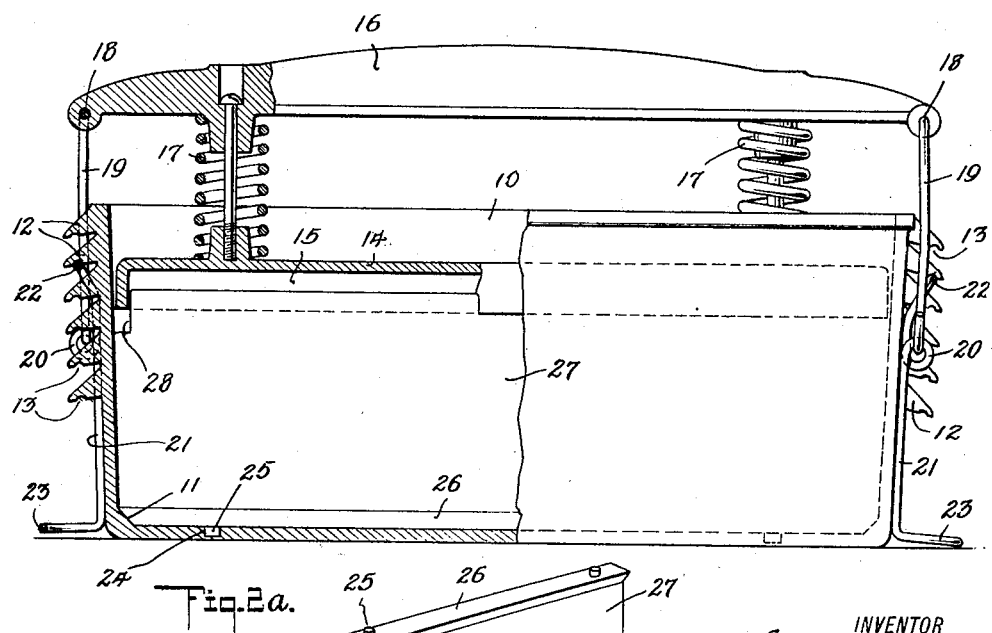
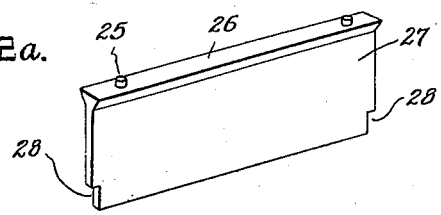
INVENTOR
H. Adelmann
BY Geo. L. Beeler
ATTORNEY Mar. 27, 1923.
H. ADELMANN
1,449,850
CORNED BEEF COOKER
Filed Dec. 24, 1921     2 sheets-sheet 2
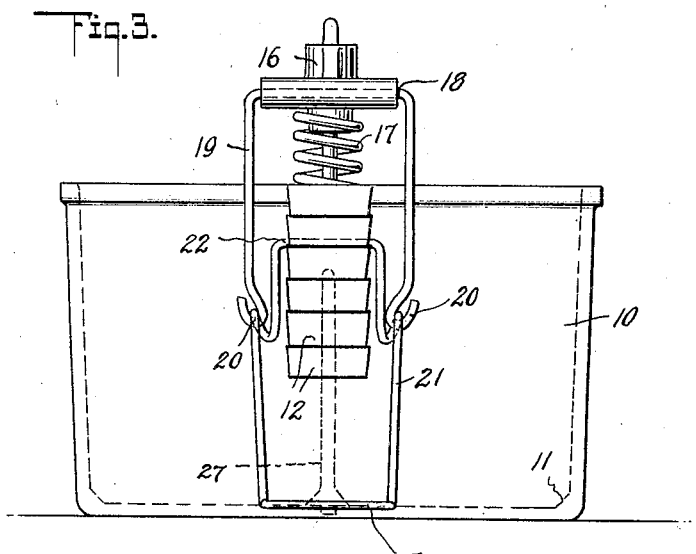
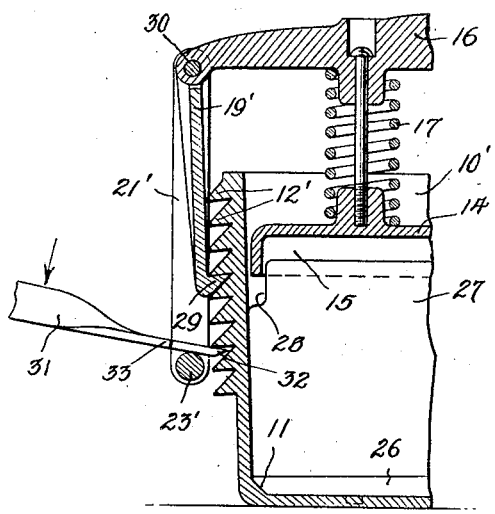
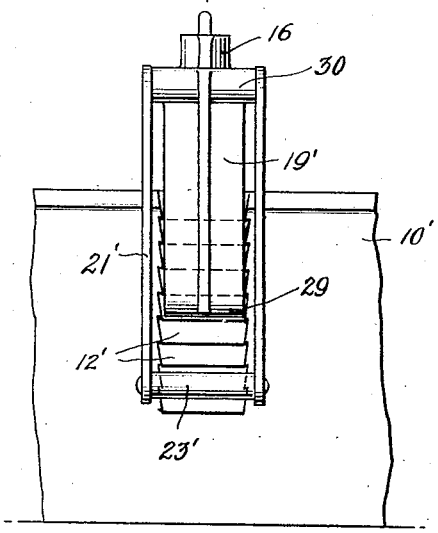
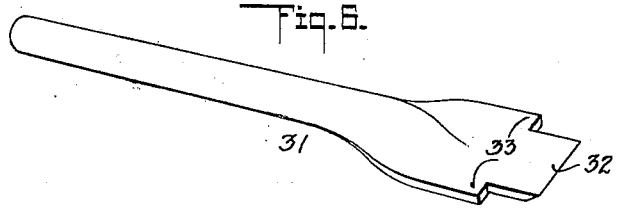
INVENTOR
H. Adelmann
BY Geo. L. Beeler
ATTORNEY Patented Mar. 27, 1923.

1,449,850

UNITED STATES PATENT OFFICE.

HANS ADELMANN, OF NEW YORK, N. Y., ASSIGNOR TO HAM BOILER CORP., OF NEW YORK, N. Y., A CORPORATION OF NEW YORK.

CORNED-BEEF COOKER.

Application filed December 24, 1921. Serial No. 524,712.

*To all whom it may concern:*

Be it known that I, HANS ADELMANN, a citizen of Germany, residing at New York city, borough of the Bronx, in the county of Bronx and State of New York, have invented certain new and useful Improvements in Corned-Beef Cookers, of which the following is a specification.

This invention relates to ham or other meat boilers or cookers and has particular reference to devices for cooking corned beef.

Among the objects of the invention is to provide a meat cooker receptacle adapted especially for cooking corned beef in large strips or pieces and so the receptacle portion of the device is provided with a longitudinal partition for the molding of individual strips or long pieces of corned beef in connection with a single cover.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a plan view of one form of the improvement.

Fig. 2 is a partial side elevation and partial section of the same on the line 2—2.

Fig. 2ª is a perspective view on a small scale indicating the receptacle partition, the same being inverted to better indicate the bottom portion.

Fig. 3 is an end view of the structure of Fig. 1.

Fig. 4 is a vertical longitudinal section of a slight modification.

Fig. 5 is an end view of the same.

Fig. 6 is a perspective view of the tool indicated in Fig. 4.

Referring now more specifically to the drawings, the receptacle 10 is substantially rectangular in all of its dimensions but has a slight vertical flare to facilitate the admission and discharge of the meat. The edge of the bottom also is beveled at 11 for the purpose of giving a better finish to the meat when the meat is turned up side down on the platter or cutting table. The bevel along each side is flat or so formed as to consist only of straight transverse elements.

As indicated in Fig. 2 at each end of the receptacle are formed a vertical series of teeth 12 each of which has an under cut or notch 13 in its lower surface spaced outward remote from the main wall and relatively close to the point of the tooth. These teeth are formed integral with the end wall.

The cover 14 is mainly flat but is provided with a downwardly projecting flange 15 movable along the inner surface of the receptacle. 16 indicates a cross bar or handle between the end portions of which and the cover 14 are arranged coil springs 17 constituting cushions to provide a resilient connection between the cover and the receptacle and to take up for any expansion of the meat during the cooking action.

Pivoted on a horizontal pivot at 18 at each end of the handle 16 is a bail 19 having linked connection at 20 with a yoke 21. The yoke has a transverse bearing member 22 at one end—namely the upper end of the yoke, and its lower end is provided with an outwardly turned finger piece 23. The bearing end 22 of the yoke is adapted to be seated in one of the notches 13, the yoke being wide enough to straddle all of the teeth 12 that may be located beneath the bearing portion 22 at such time. The yoke in effect acts as a lever of the second class, so that when the force of the operator's hands is applied to the end 23 thereof and downward toward the end of the receptacle the points of connection at 20 between the yoke and the bail will be brought downward into a vertical plane between the vertical plane of the bearing 22 and the end of the receptacle. In other words, when the yoke is swung against the end of the receptacle as shown in Fig. 2 the reaction upward on the bail due to the springs 17 will come between the bearing 22 and the receptacle wall and so the fastening means will be self locking or self retaining. With the cover applied and locked as shown in Fig. 2 the cooking operation may proceed in a well known manner, and after the cooking is completed the locking devices may be detached from the notched teeth by simply swinging or drawing outward on the ends 23 of the yokes and thereby permitting the bails to clear the series of teeth, leaving the cover and handle or bar free to be withdrawn from the receptacle.

In the longiutdinal center of the bottom of the receptacle are holes or pits 24 into which project dowels 25 carried by the bottom flaring edge 26 of a substantially flat partition 27 extending along the vertical central plane of the receptacle, thus dividing the receptacle into two substantially equal longitudinal compartments for as may separate strips or pieces of corned beef or the like. The flared edge 26 provides oppositely extending bevels similar in form to the bevel 11, whereby a loaf cooked on either side of the partition will be beveled uniformly around its upper surface when turned upon a platter. The partition 27 extends upward to a horizontal plane somewhat below the top of the receptacle, and the cover 14 operates downward toward and over the upper edge thereof. In order to accommodate the flange 15 as far downward as it may be desired for it to go the upper corners of the partition are notched out at 28. The partition may be removed from the receptacle when the device is being used for cooking single large pieces of material or single masses of food products such as puddings, head cheese, or the like.

The receptacle 10' of Figs. 4 and 5 is practically the same as above described except that the teeth 12' at the end walls thereof are more perfectly triangular in form or not being provided with the under cuts or notches 13. These teeth however preferably project downward as well as outward from the end walls for the better co-operation with catches 19' having hooks 29 at their lower ends having direct co-operation with any selected teeth of the two series. The catches are pivoted at 30 to the outer ends of the handle or bar 16.

For the application of power to the handle or cross bar in the setting of the cover 14 I provide for each end of the handle 16 a yoke 21', the same being hung from the same pivot 30 as the associated catch 19'. This yoke is indicated as comprising two parallel side bars spaced far enough to straddle the teeth 12' and having a bar 23' extending between their lower ends and constituting a bearing for a tool 31 in the nature of a lever of the second class. This lever has a point 32 adapted to take under any selected tooth 12' while the portion of the tool not far remote from the point bears upon the bearing rod 23'. Shoulders 33 sufficiently spaced to engage the lower ends of both of the side bars of the yoke prevent the tool from projecting too far through the yoke, thus insuring that the operator by bearing downward on the outer end of the tool will have sufficient power for drawing the cover downward with ample force for compressing any commodity in the receptacle. As will be understood from Fig. 4 the application of the tool to the yoke and with a downward thrust thereon the hook 29 within the yoke will be brought downward to engage the next tooth, this engagement being completed by a simple movement of the operator's thumb or finger against the outer side of the catch. The tool will then be removed and the device thus equipped will be ready for the cooking operation and have no objectionable projecting parts. After the cooking operation is completed if the hooks are held as a result of the swelling of the meat with any material amount of firmness they may be released easily by the reapplication of the tool in the manner above described. When the yokes are drawn downward the hooks will be free to gravitate outward automatically into released position. For the removal of the cover or for manipulating it independent of or in connection with the receptacle the yokes may be swung around the pivots 30 far enough for them to be used as bails, the portions 23' thereof constituting finger holds.

I claim:

1. A cooker of the class described comprising a body having an open top and a flat bottom, the bottom being provided with one or more pits, a flat partition supported longitudinally of the bottom and having as many dowels as there are pits having co-operation therewith, and a cover movable within the receptacle toward the upper edge of the partition.

2. A device as set forth in claim 1 in which the partition has a straight upper edge lying in a horizontal plane spaced below the top plane of the receptacle.

3. A cooker of the class set forth comprising a body having an open top and a bottom, a partition removably located within the body and supported upon said bottom, and means comprising dowels and pits between the bottom edge of the partition and said bottom to retain the partition in position from lateral movement.

4. A cooker as set forth in claim 3 in which the bottom edge of the partition is provided with downwardly projecting dowels and the body bottom is provided with a correspondingly arranged number of pits to receive the dowels.

In testimony whereof I affix my signature.

HANS ADELMANN.